United States Patent
Lofgren, III

(10) Patent No.: US 10,316,990 B1
(45) Date of Patent: Jun. 11, 2019

(54) METHOD OF SUPPLYING POWER TO EQUIPMENT

(71) Applicant: Robert Deforest Lofgren, III, Conifer, CO (US)

(72) Inventor: Robert Deforest Lofgren, III, Conifer, CO (US)

( * ) Notice: Subject to any disclaimer, the term of this patent is extended or adjusted under 35 U.S.C. 154(b) by 156 days.

(21) Appl. No.: 15/450,748

(22) Filed: Mar. 6, 2017

Related U.S. Application Data

(62) Division of application No. 14/926,371, filed on Oct. 29, 2015, now Pat. No. 9,587,768.
(60) Provisional application No. 62/072,234, filed on Oct. 29, 2014.

(51) Int. Cl.
| | | |
|---|---|---|
| *F16L 1/024* | (2006.01) | |
| *F16L 3/22* | (2006.01) | |
| *B60P 1/64* | (2006.01) | |
| *B60P 1/43* | (2006.01) | |
| *B60P 3/40* | (2006.01) | |

(52) U.S. Cl.
CPC ............. *F16L 3/22* (2013.01); *B60P 1/43* (2013.01); *B60P 1/64* (2013.01); *B60P 3/40* (2013.01)

(58) Field of Classification Search
CPC ... F16L 3/22; F16L 3/222; F16L 1/028; F16L 1/036; F16L 1/038; B60P 3/40; B60P 1/64; B60P 1/43; E21B 7/02; B60R 11/00; B60R 2011/0042; B60R 2011/0049; B60R 2011/008; B60R 2011/004; B60R 2011/0075; B62D 63/02; B65G 1/0442; B65G 1/026; B65G 1/10; B65G 1/20; B65G 57/00; B65G 57/02; B65G 57/03; B65G 57/18; B65G 57/186
See application file for complete search history.

(56) References Cited

U.S. PATENT DOCUMENTS

| | | | | |
|---|---|---|---|---|
| 5,005,509 | A * | 4/1991 | Williams | B63B 17/00 114/343 |
| 6,089,795 | A * | 7/2000 | Booth | B60P 1/60 209/133 |
| 6,164,883 | A * | 12/2000 | Wilcox | B65G 1/0442 410/32 |
| 2016/0252194 | A1* | 9/2016 | Cheney | F16L 1/036 414/528 |
| 2017/0199505 | A1* | 7/2017 | Harper | E04H 5/02 |
| 2018/0370450 | A1* | 12/2018 | Slocombe | B60R 9/06 |
| 2019/0009838 | A1* | 1/2019 | Rosenfeld | B62D 33/0207 |

OTHER PUBLICATIONS

Disclosure of Natural Gas Pipeline transport by Inventor/Applicant (attached).

* cited by examiner

*Primary Examiner* — Jun S Yoo
(74) *Attorney, Agent, or Firm* — Reilly Intellectual Property Law Firm

(57) ABSTRACT

A method of providing a transportable line pipe and distribution hose supply crossing assembly for use in supplying natural gas fueled drilling rig engines or fracking equipment with natural gas, electricity and pressurized air from mobile storage and vaporization facilities. A skid frame and ramp assembly are transported then assembled in end-to-end configuration for a continuous pipeline with a crossing ramp.

18 Claims, 7 Drawing Sheets

Fig. 1

METHOD OF SUPPLYING POWER TO EQUIPMENT

CROSS-REFERENCE TO RELATED APPLICATIONS

This present application is a divisional of U.S. application Ser. No. 14/926,371 filed on Oct. 29, 2015 for TRANSPORTABLE NATURAL GAS PIPELINE and is incorporated by reference herein.

BACKGROUND

The present device relates to natural gas conduits. In particular, it relates to a method of providing a transportable line pipe and distribution hose supply crossing assembly for use in supplying natural gas fueled drilling rig engines or fracking equipment with natural gas, electricity and pressurized air from mobile storage and vaporization facilities.

A drilling rig is an assembly for boring holes in the ground. Drilling rigs can be massive structures housing equipment used to drill water wells, oil wells, or natural gas extraction wells. Drilling rigs can be designed as transportable mobile equipment to be mounted on trucks, tracks or trailers. Transportable drilling rigs had been predominantly diesel fueled to provide mobility, in as early as 2010 certain energy groups had worked together to repower diesel fueled drilling rigs with natural gas dedicated engines. In the absence of field gas, natural gas proved to be the most widely accepted practical fuel solution, while further providing advantages in cost savings, but with diesel-like mobility and useful with onsite fuel reserves.

To this end, natural gas fueled drilling rig technology has gained wide acceptance in the industry. Moreover, certain leaders in the industry have further designed, built and commissioned natural gas mobile facilities, including mobile storage and vaporization trailers and pipeline components, to provide the natural gas fuel to the natural gas fueled engines, on site. In this manner, it is now well accepted practice to run drilling rigs entirely on natural gas, and to thereby realize a significant savings in fuel cost, over the former practice of using diesel fuel while also reducing NOx and particulate emissions by as much as 25%. Further, it is also possible to utilize natural gas facilities in combination with fracking equipment.

Polymer piping is used to connect the natural gas fueled engines and the natural gas mobile storage and vaporization equipment. The presently accepted practice, in the industry, is to assemble and run a 7.62 cm diameter poly pipe structure from the natural gas mobile storage and vaporization equipment supply trailer to the drilling rig. In addition, a 2.54 cm purge line is also commonly used to purge the air out of the system, prior to start up. Trenches must be excavated using special equipment and contractors for placement of the polymer pipe on the ground in those road crossings where the Operators find it necessary to transport machines and heavy equipment over the piping.

Operators also often find it desirable to run a compressed air line and electric power cables in the trenches along with the pipeline. Over time, operators began laying thick steel plates over the trenches to keep the polymer pipeline from being crushed or damaged.

In practice, it has been learned that certain problems exist with the foregoing methods for supplying natural gas to a drilling rig. For example, specially trained crews and equipment must be scheduled to arrive at the rig in order to dig the trench, and to weld the sections of polymer pipe in construction of the pipeline. Certain permits have to be obtained for trench excavation which often results in a delay. Often times, natural gas fueled rigs could not start operation, at a new location, when the trenching crews were scheduled for work elsewhere. The adhesive welds would also fail during operation and, with heavy equipment moving over the line, even the buried pipes would become either crushed or damaged. In the winter months, operators also experienced problems with water freezing in the trench, and the frozen ground is difficult to trench. Crews have also found it difficult to remove the lines from the frozen ground. Moreover, this approach drives up the cost in moving and assembly of a rig to a new location, the polymer pipeline was only good for one drilling location, and trenching machines were often very unreliable during the winter months.

The current method provides for a transportable reusable natural gas pipeline that is capable of making connection over crossings and between the natural gas mobile storage and vaporization trailers and the natural gas fueled engines, without a need for special permits, crews or equipment for trenching.

BRIEF SUMMARY

In accordance with the purpose of the present method, as embodied and broadly described herein, briefly, a transportable natural gas conduit is provided. The conduit has a line pipe, hoses and a distribution hose storage rack that also acts as a pipeline. The storage rack has a base plate with an upper working surface and a lower surface. The lower surface is connected to a generally I-shaped rectangular skid frame. The skid frame has a longitudinal span and first and second rows of pipe support rack trestles. The trestles include tiers of upwardly angular lateral pipe support arms. The support arms are connected to one another by vertical support members. The vertical support members are connected to the upper working surface of the skid frame in a lateral spaced relationship so that the vertical support members define a central pipe line corridor. The central corridor extends the full length of the longitudinal span. A bulkhead stacking frame is connected to the skid frame at each of the opposite ends. The bulkhead frame has at least one void which is positioned in axial alignment with the central corridor so that the corridor is capable of carrying at least one line pipe section. The line pipe section is capable of being made in connection with a pipeline facility, such as a natural gas vaporizer trailer, component through either of the opposite ends of the skid frame, and a stackable crossing ramp.

The crossing ramp has a pair of generally I-shaped longitudinal rail members. The rail members are capable of being in stacked support, at opposite ends thereof, on the top of the bulk head stacking frame. A pair of oppositely inclined crossing ramp sections have lengthwise bend formations fashioned at a predetermined angle so that an inner margin of each of the inclined ramp sections is capable of being positioned to weld a lap connection with an upper horizontal surface of each of the respective one of the I-beam rail members. A removable horizontal tunnel cover section has outer portions which are capable of making a removable flange joint connection with a respective inner upper surface portion of each of the I-beam rail members when the tunnel cover is disposed in tight fitment between the bend formations of the ramp sections.

Additional details will be set forth in part in the description that follows, and, in part, will be obvious from that description or can be learned from practice or testing of the present assembly. The present method is described and more particularly pointed out in the appended claims.

DRAWINGS

The accompanying drawings, which are incorporated in and which constitute a part of the specification, illustrate at least one embodiment of the present assembly.

FIG. 1 is a perspective view of the stackable crossing ramp assembly positioned on the hose storage skid rack for transport.

DETAILED DESCRIPTION

Figure 2:
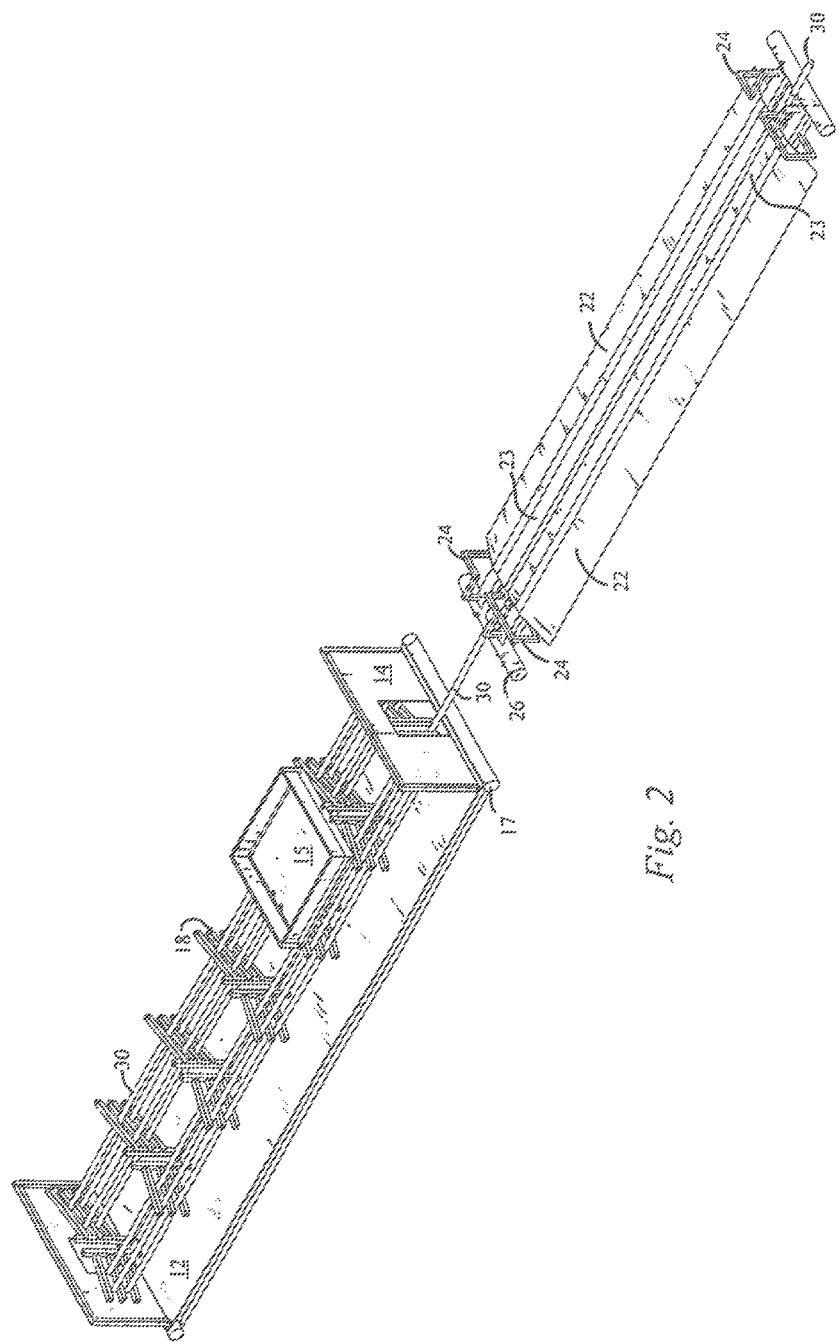
FIG. 2 is a perspective top view of the stackable crossing ramp assembly when aligned for use in combination with the hose storage skid rack and piping components of the pipeline.
Figure 3:
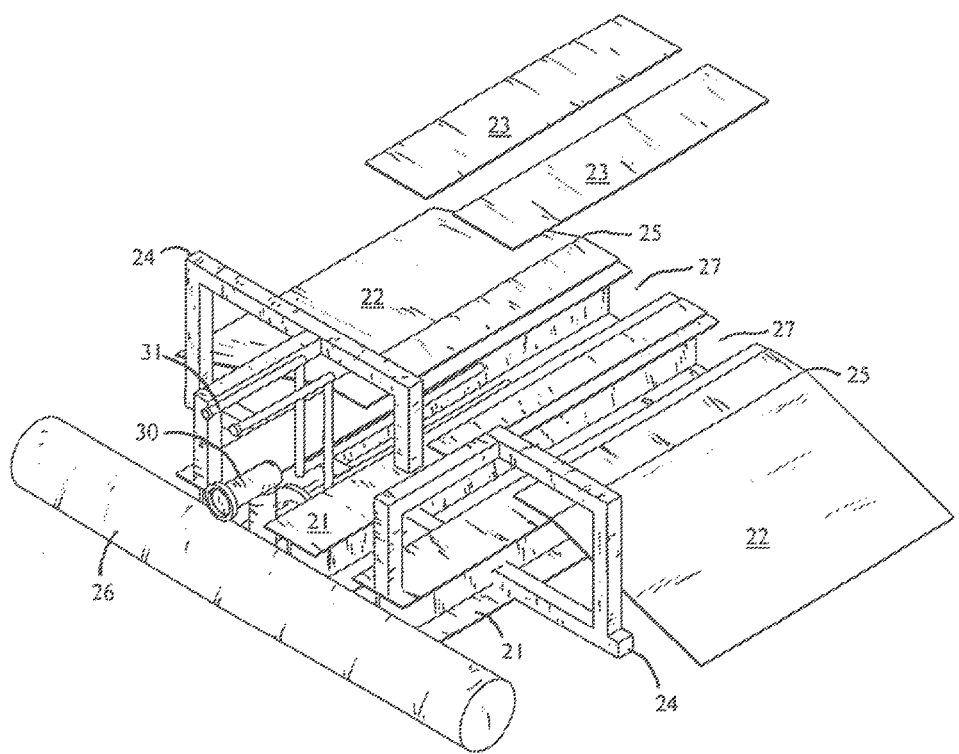
FIG. 3 is a perspective top end view showing an embodiment where the stackable crossing ramp assembly includes two tunnels and a use with the purge and compressed air lines.
Figure 4:
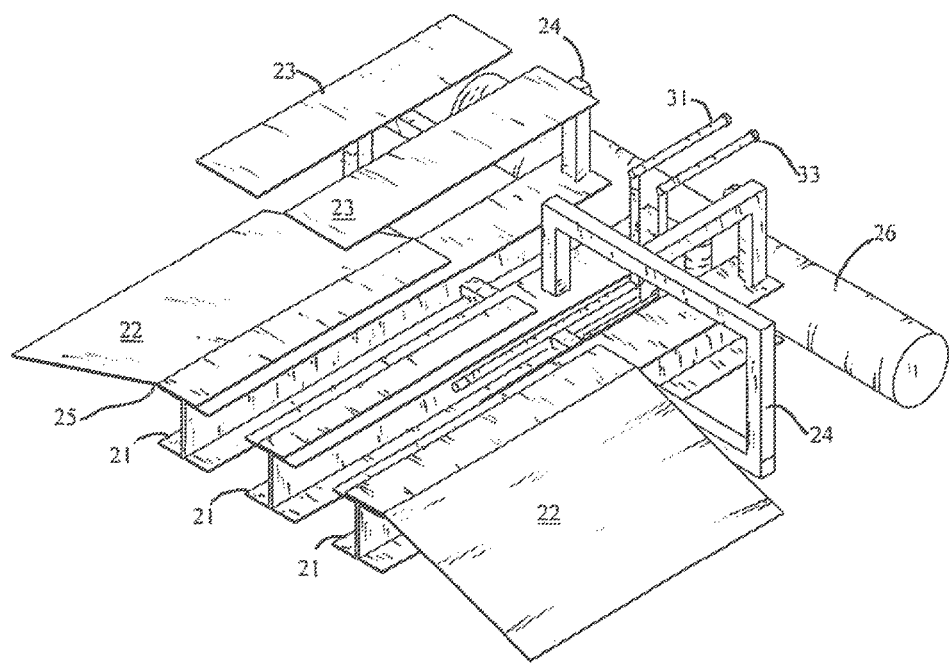
FIG. 4 is a perspective top end sectional view of the embodiment shown in FIG. 3.
Figure 5:
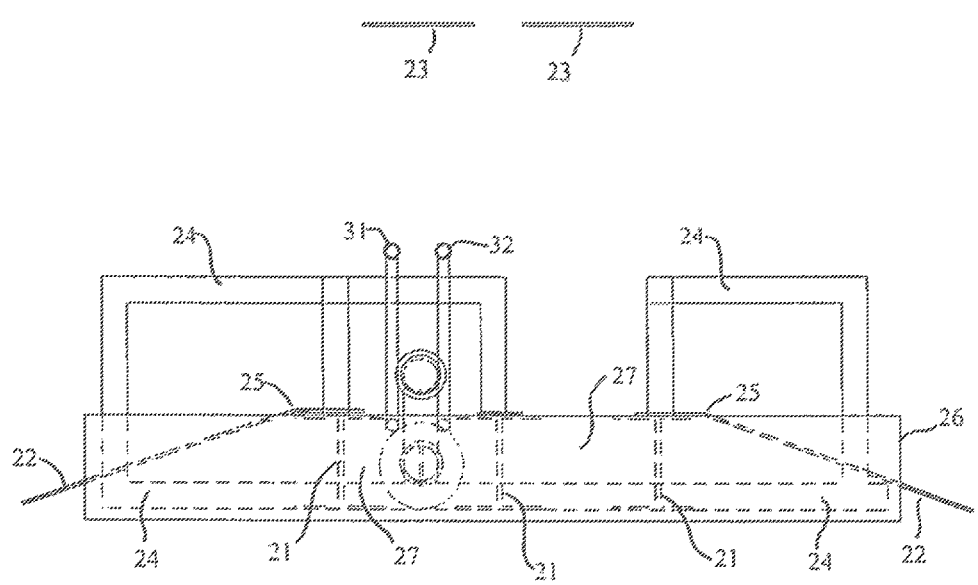
FIG. 5 is an end view of the embodiment shown in FIG. 3.

Unless specifically defined otherwise, all scientific and technical terms, used herein, have the same ordinary meaning as would be commonly understood by one of ordinary skill in the art. As used herein the phrases "line section" means a designated section of a continuous run of conduit. "Line pipe" is a conduit that is part of a line section. "Liquefied Natural Gas (LNG) Facilities" means a pipeline facility that is used for liquefying natural gas or synthetic gas or transferring, storing or vaporizing liquefied natural gas. A "Pipeline corridor" is a linear area where one or more pipelines (either part of the same or difference pipeline systems) are closely grouped in a single right-of-way. "Pipeline" includes line pipe, conduits, hoses, valves, and other appurtenances attached to the pipe, pumping, compressor units, and associated fabricated units, metering, regulating, and delivery stations, and holders and fabricated assemblies located therein, and breakout tanks. "Road crossing" means laying of a pipeline over a roadbed, roadway, or traveled way.

Reference will now be made in detail, to the present embodiments, including the examples of which are illustrated in the accompanying drawings. In the drawings, like numerals will be used in order to represent like features of the present assembly.

Figure 1:
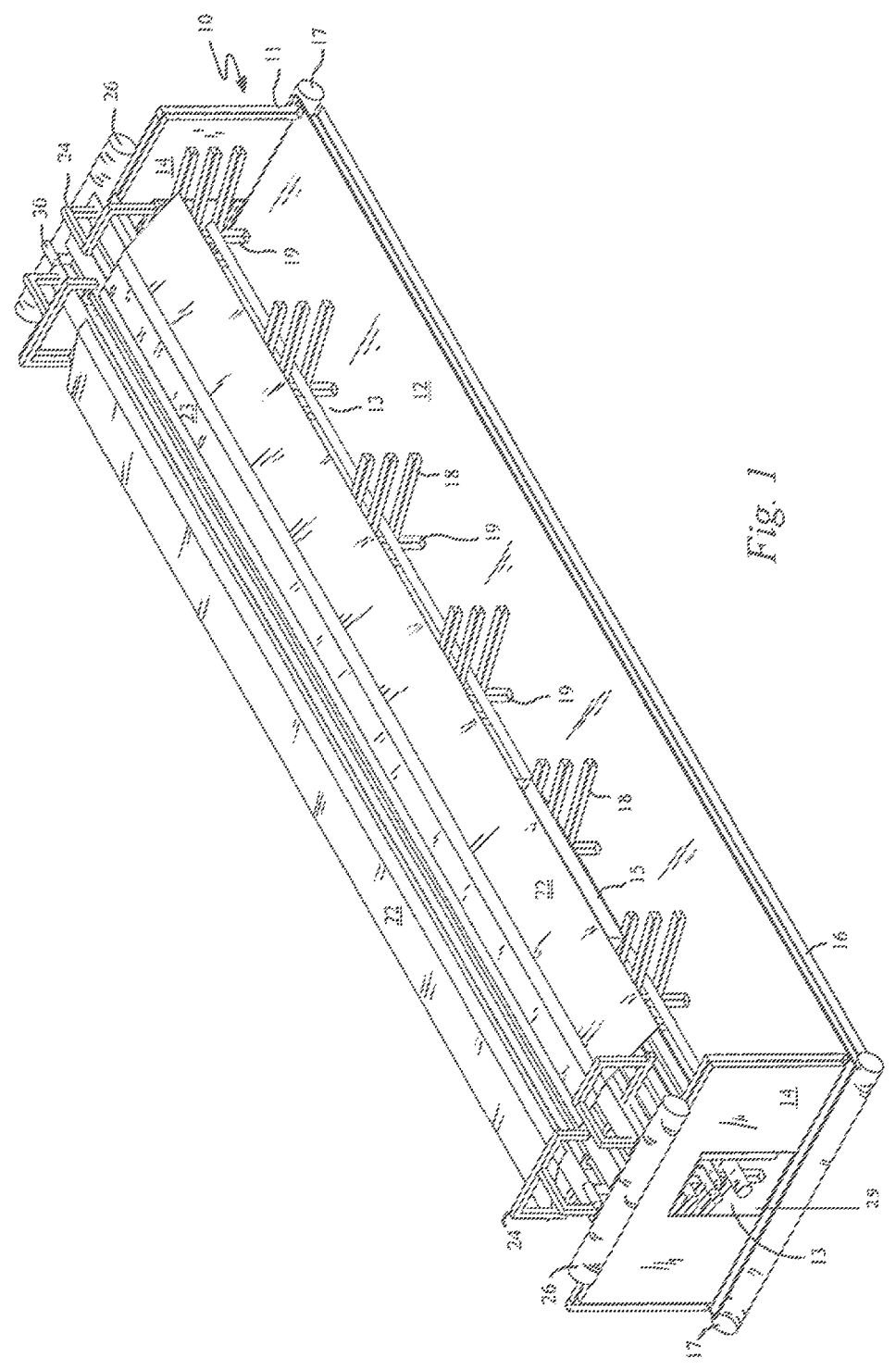

There is provided a transportable and recyclable liquid natural gas supply assembly 10 shown in FIGS. 1-7. The assembly 10 includes all elements necessary to supply natural gas to a drilling rig, fracking system or any other type of operation where natural gas is utilized. This is accomplished without the need to dig trenches, weld plastic pipe, or wait for contractors to arrive and establish the natural gas connection. All of the elements making up the assembly are reusable, the assembly and disassembly is quick and easy without the use of special tools, and is capable of being completed without a need for skill in labor.

The assembly 10 includes a hose storage skid rack/ pipeline and crossing ramp or ramp assembly. Preferably, the ramp is stackable on the skid rack but other configurations may be used without departing from the scope of the assembly. For example, the skid rack may be stackable on the crossing ramp. The hose storage skid rack and ramp are typically welded frame assemblies being preferably constructed of mechanical/structural steel square tubing, pipe and plate sections, such as carbon steel. Tunnel cover 23 and ramp sections 22 are desirably hot rolled steel floor diamond plate. The ramp and hose storage skid rack are painted and/or powder coated.

Figure 6:
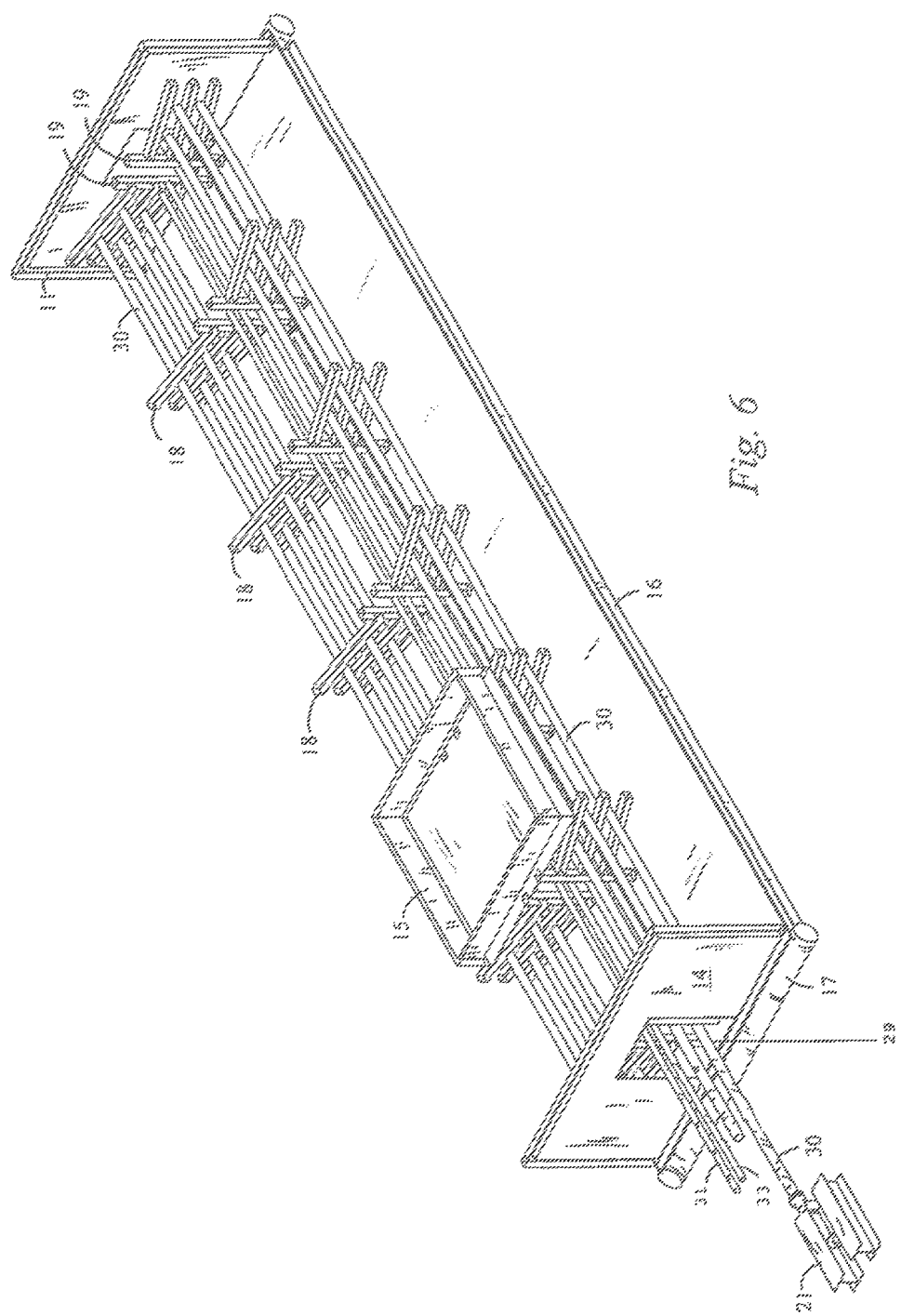
FIG. 6 is a perspective top view showing connection of the distribution supply line connectable to the crossing ramp assembly through the corridor and bulkhead of the hose storage skid rack.

The hose storage skid rack/pipeline shown in FIG. 1 includes a steel base plate 12, or floor panel plate. The base plate 12 has a top or upper working surface and a bottom or lower surface welded to a sub-frame 16. The sub-frame 16 is constructed with a plurality of longitudinally disposed I-beam support members. The skid rack includes opposite ends and each of the opposite ends includes oppositely aligned steel face plates 14 welded to steel bulkhead stacking frame 11 support members. The bulkhead stacking frame 11 support members are welded to the floor panel base plate 12 and skid rack sub-frame 16 assemblies. The steel face plates 14 include voids 29, or openings, for connecting natural gas line pipe or distribution pipe 30 through the tunnel(s) 27 of the crossing ramp. The distribution piping 30, purge pipe 31, compressed air line 33, and electrical cables (not shown) may all be inserted through the voids 29 as shown in FIG. 1 and FIG. 6.

The skid frame 16 has a longitudinal span and first and second rows of pipe support rack trestles 18 which are of any design such as built-up rows of a plurality of longitudinally extending generally U-shaped channel members, clips, lever arms or tubes. The trestles include at least three tiers of lateral, upwardly angular, pipe support arms 18. The pipe support arms 18 are in a vertical spaced relationship so that the arms 18 are capable of carrying a plurality of supply hoses 30 and components, such as flange fittings, preferably 7.62 cm stainless steel natural gas flexible distribution supply hoses. The support arms 18 are connected to one another by vertical support members 19 and terminal ends of the support arms 18 are free and not connected to a support so that the supply hoses 30 are freely removable from the skid frame 16. The vertical support members 19 have upper and lower ends. The lower ends of the vertical support members 19 are fastened, or welded, to the floor panel base plate 12 and the sub-frame 16. The vertical support members 19 are connected to the working surface of the skid frame in a lateral spaced relationship so that the vertical support members 19 define a central pipe line corridor 13. With the present embodiment, two adjacent vertical support members 19 are positioned, side-by-side, in opposite spaced relationship so that the branches extend oppositely and outwardly, from a central longitudinal axis of the skid plate rack, in a spaced relationship which creates the pipeline corridor 13 between the upright vertical members 19. The central corridor 13 extends the full length of the longitudinal span. The bulkhead stacking frame 11 is connected to the skid frame at each of the opposite ends. The bulkhead stacking frame 11 incorporating the steel face plates 14 has the central void 29 which is positioned in axial alignment with the central corridor 13 so that the corridor 13 is capable of carrying at least one line pipe 30 section. The distribution piping 30, purge pipe 31, compressed air line 33, or electrical cables may be permanently installed in the corridor 13 or on the storage skid rack and inserted through the voids 29 for easy accessibility.

The line pipe section 30 is capable of connection with a pipeline facility, such as a natural gas vaporizer trailer component, through either of the opposite ends of the skid frame, and the stackable crossing ramp. The corridor 13 is in longitudinal alignment with the voids 29, or openings, in the bulkhead steel plate faces 14, so that a natural gas line pipe is connectable to pipeline facility components through the entire length of the line pipe and distribution pipe 30 hose storage skid rack, on either end. The piping for the compressed air and purge line may also be run through the voids 29. The skid frame may include a pair of transverse cylindrical bumpers 17 at the opposite ends thereof, and is transportable by forklift, trailer or by dragging.

In the present embodiment, the hose storage skid rack is desirably dimensioned so that it has a longitudinal span which extends 10.67 m long, and being desirably ×1.22 m wide×1.08 m high. In this manner, the support arms 18 of the trestle members are capable of being loaded with natural gas distribution supply hose 30 from either side, or are dimensioned, in a predetermined configuration, to carry at least twelve 7.62 cm hoses, and twelve 2.54 cm hoses. The hose storage rack may, but need not, be lockable. In addition, at least one component storage box 15 is connected adjacent to an upper edge of at least two of the trestles to enable further storage of pipeline components such as bolts, blank flanges and gaskets. In this manner, the storage trestles include horizontal top members to either support the component storage box 15, or further support the crossing ramp assembly, when stacked.

The skid storage skid rack is preferably constructed to carry at least six natural gas flexible distribution pipes 30. The natural gas distribution pipes 30 are built using 7.62 cm diameter sections being 10.05 m long although variations in size will be expected. The distribution pipes 30 are built of stainless steel single braided hose, such as those which are being offered for sale by Microflex, Inc. The hose material is generally a corrugated metal hose being stainless steel type 321. Single braid material is preferably 304 stainless steel. The MAWP of the 7.62 cm hose is 385 psi, and the burst pressure is 1540 psi. Maximum service temperature is 815.6° C. The natural gas distribution supply hoses 30 preferably have interlocked metal hose over 100% of each length to protect the hose. Hose connection components are desirably 7.62 cm, 304 SS, 68.04 kg, 4-bolt flanges connectable with 15.88 mm stainless steel bolts and brass nuts. The 7.62 cm flanges have an outside diameter of 19.05 cm. The 7.62 cm blank flanges are provided for covering hose ends during the rig moves. The flanges are GTAW welded to the hoses. The gasket material is GARLOCK Grylon #3504, having a minimum temperature −232.2° C., a maximum temperature of 260.0° C., and a maximum pressure of 800 psi. Depending upon the operations involved, different size hoses, flanges, gaskets and manufacturers may be used without departing from the scope of the assembly.

With the present embodiment, the skid rack is also constructed to carry at least six purge hoses 31. The purge hoses 31 are preferably built of 2.54 cm diameter stainless steel braided hose being 9.9 m in length, examples of which may also be supplied by Microflex, Inc. Corrugated metal hose material is stainless steel type 312. Single braid material is preferably 304 stainless steel. MAWP for the 2.54 cm hose is 795 psi, with burst pressure being 3,180 psi. The maximum service temperature is 815.6° C. The hose 31 desirably has stainless steel interlocked metal hose over 100% of its length to protect the purge hose 31. The desired hose connections are 2.54 cm 304 stainless steel bolt flanges with 1.27 cm stainless steel bolts and brass nuts. 7.62 cm blank flanges may be provided for covering the purge hose 31 ends during the rig moves.

The Prometheus Energy™ vaporizer trailer pipeline facility is well accepted in the industry. Thus, the present assembly is contemplated for use in conjunction with the 7.62 cm natural gas connection to a Prometheus Energy™ vaporizer trailer. There, it is preferable to provide a short 7.62 cm pipe system made up of the following: a 7.62 cm, 68.04 kg, 4-bolt flange stainless steel on both ends, a pair of 7.62 cm stainless steel 90 degree elbows, and a 7.62 cm stainless steel pipe. This assembly provides for the 7.62 cm flexible hose to be connected near ground level which reduces stress on the hose end. An adapter is used going from the 37.62 cm, 68.04 kg flange to a hammer union, used on the rig.

The crossing ramp assembly has a pair of generally I-shaped longitudinal rail members 21. The rail members 21 are capable of being in stacked support, at opposite ends thereof, on the top of the bulk head stacking frame 11. A pair of oppositely inclined crossing ramp sections 22 have lengthwise bend formations 25 fashioned at a predetermined angle so that an inner margin of each of the inclined ramp sections 22 is capable of being positioned to weld a lap connection with an upper horizontal surface on each of the respective one of the I-beam rail members 21. A removable horizontal tunnel cover 23 section has outer lateral portions which are capable of making a removable flange joint connection with respective inner upper surface portions of each of the I-beam rail members 21 when the tunnel cover 23 is disposed in tight fitment between the bend formations of the ramp sections 22.

The ramp assembly is stackable on top of the hose storage skid rack for ease in transportation. Not unlike the storage skid assembly, the ramp is desirably constructed of steel plate supported on a longitudinally extending I-beam 21 sub-frame. The steel plate has an upper working surface which is desirably constructed using diamond tread plate. The ramp assembly includes a pair of oppositely disposed inclined plates including longitudinal bend formation 25 along a longitudinal axis thereof. The bend formations 25 define horizontal inner and outer inclined ramp section 22 portions, so that the inner portions are capable of lap joint welded connection to the horizontal surface of the I-beam 21 sub-frame rail members, while the inclined outer portions are capable of grounded support and establishing the necessary inclined surface, for ingress and egress, from outer edges thereof over the tunnel cover 23 ramp for lifting a vehicle to be crossing over the ramp assembly.

The ramp assembly is configured with at least one, but preferably a pair, of open top tunnels 27 extending along a central longitudinal axis of the ramp assembly. The open channels 27 are generally defined between the I-beam 21 rail members of the sub-frame. With this embodiment, a third I-beam rail member 21 is centrally disposed along the longitudinal axis thereby dividing the tunnel into two distinct casings. The tunnels 27 are coverable with steel ramp tunnel cover plates 23 and are dimensioned in width so that outer edges of the steel cover plates 23 are capable of making a flange joint connection with the upper surfaces of the three-spaced apart I-beam 21 rail members of the sub-frame. In this manner, the steel cover plates 23 are removable so that the distribution piping 30, purge pipe 31, compressed air line 33, and electrical cables (not shown) are loadable from above. In yet another embodiment, one of the tunnels 27 is dedicated for use in casing electrical cables while the other is dedicated for use in protecting the distribution supply pipe 30, and remaining components.

The ramp assembly has opposite ends and at each of the opposite ends is a guard rail safety frame assembly. In the presently preferred embodiment, the guard rail frame assembly is constructed as two structural steel frames 24 positioned, in lateral spaced relationship, adjacent to each of the opposite corners at the opposite ends of the ramp sub-frame. In this manner, a vertical clear channel is established between the steel frames, at each end, so that the ramp, with the cover plates 23 removed, is top-loadable throughout, with a pipeline 30, 31, 33 or electrical cable bridging an entire length of the crossing ramp when connecting the natural gas vaporizer trailer to the natural gas engine.

The ramp assembly is preferably a built-up member being 10.67 m long, 21.29 cm high, and 1.98 m wide. The ramp assembly is sufficient in construction so that it is capable of supporting vehicles and heavy equipment to be lifted over the natural gas distribution supply lines, when crossing. The tunnels 27 are configured to receive at least three stainless steel lines or pipe, including at least one 7.62 cm natural gas distribution supply line 30, one 2.54 cm purge line 31, and one 5.08 cm compressed air line 33. The tunnel 27, or suit case, portion of the ramp includes a pair of longitudinally extending channels whereby one is desirably configured for receiving the 7.62 cm stainless steel natural gas distribution supply lines 30 and one is configured for casing the electrical cables, if any. The entire stackable assembly 10 can be loaded on a trailer by fork lift, crane, or moved by dragging the unit from one end. A pair of transverse cylindrical bumpers 26 is desirably connected at the opposite ends thereof.

Referring now to FIGS. 2 and 8, in use, the line pipe and distribution line storage skid rack and ramp assemblies are designed to cooperate in function when positioned in an end-to-end alignment. This functionality is useful for connecting a natural gas, air, liquid, or cable from any supply source facility to a wide variety of engines, compressors, pumps, or power supplies. In this manner, the ramp assembly is simply lifted from the pipe storage skid rack, aligned in an end-to-end configuration with the skid rack, the supply hoses 30 are removed from the trestle support arms 18, connected to the facility, connected to the skid rack pipe section 30 that is positioned along the corridor 13, and connected to the ramp assembly through the bulkhead face plate 14 openings 29, the distribution supply pipeline sections 30 are top loaded into the ramp tunnels 27, and the tunnel ramp covers 23 are located in place to provide a complete pipeline from the natural gas facility, over the crossing and to fuel the natural gas engine. In this manner, the present assembly provides a new transportable pipeline which is rapid in deployment, easy to assemble and dissemble, reusable and transportable to a new location along with the drilling rig. The ramp and storage rack include all of the piping and components, permanently in place, so that they are capable of assembly to form a continuous pipeline which is suitable for transporting and laying out over 70 m of supply hose 30 and pipe which allows maximum flexibility, in use, with a wide variety of drilling rig locations. Once the job is complete, the hoses are disconnected and stored in pipe storage skid rack. The ramp assembly is then replaced on to the storage skid rack for transportation to the next site preferably using a single transport trailer.

Figure 7:
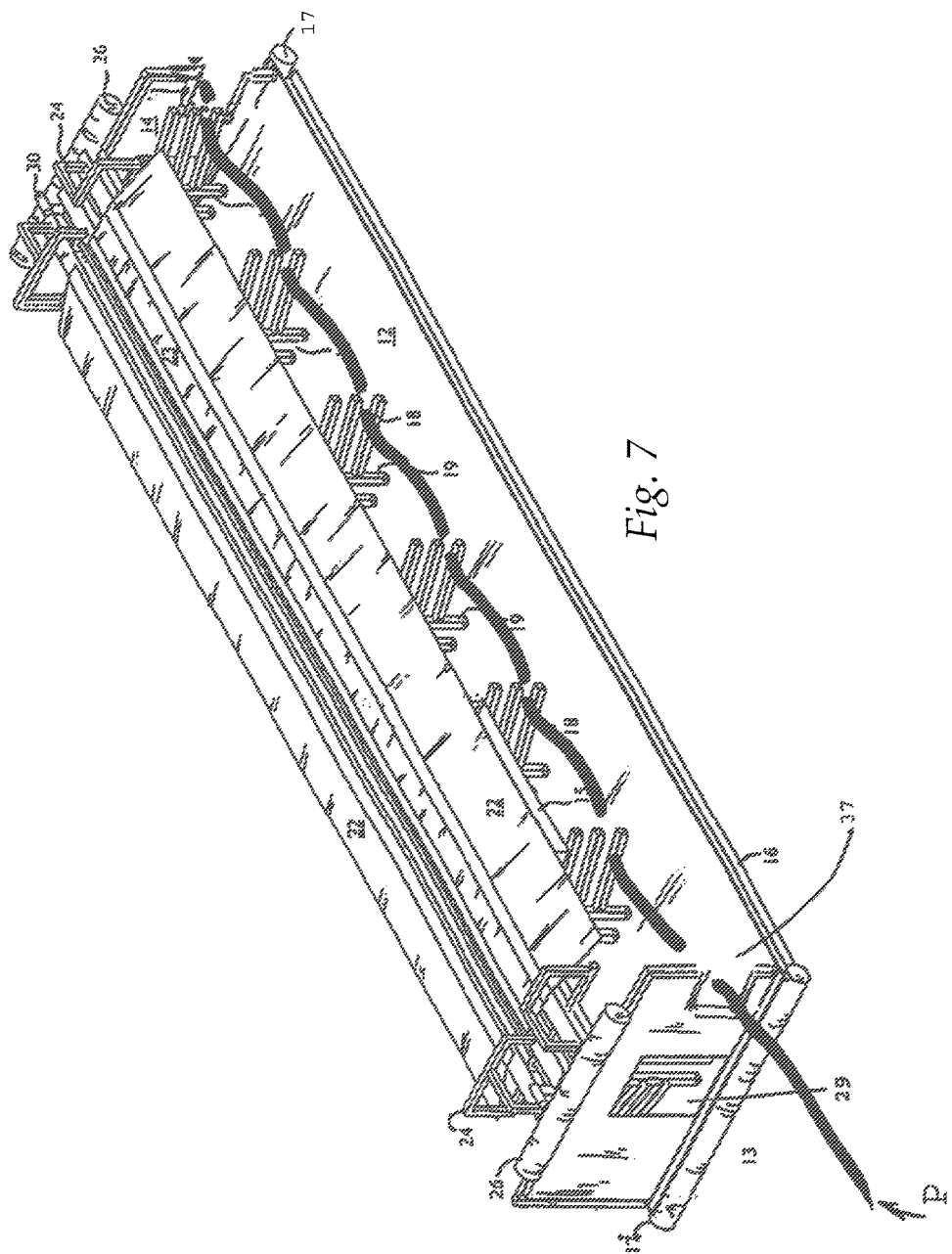
FIG. 7 is an alternate perspective view of the stackable crossing ramp assembly positioned on the hose storage skid rack for transport.

Another form of assembly involves running electrical power cables P through the hose storage rig as shown in FIG. 7. The cables are set on the support arms 18 and then run through an additional opening or void 37 or simply placed in the opening but not inserted through the face plate 14.

It is therefore to be understood that while different embodiments are herein set forth and described, the above and other modifications may be made in the composition of materials as well as construction and arrangement of parts without departing from the spirit and scope of the method.

I claim:

1. A method of assembling a natural gas conduit, the steps comprising:
    separating a ramp assembly from a conduit storage skid rack;
    aligning said ramp assembly in an end-to-end configuration with said skid rack in a co-linear manner;
    removing pipeline from said skid rack;
    top loading said pipeline into tunnels formed by said ramp assembly;
    placement of tunnel ramp covers on said ramp assembly; and
    connecting said pipeline to a natural gas, air, liquid, or cable from any supply source facility to a wide variety of engines, compressors, pumps, or power supplies.

2. In the method according to claim 1 wherein distribution supply pipeline secured on said skid rack is connected to said ramp assembly.

3. In the method according to claim 2 wherein said supply pipeline is connected to said ramp assembly through bulkhead face plate openings.

4. In the method according to claim 1, the steps further include providing a complete conduit of natural gas from the natural gas facility, internally within said ramp assembly, and to fuel the natural gas engine.

5. In the method according to claim 1, said storage rack includes bulkhead stacking frames to support said ramp assembly.

6. In the method according to claim 1 wherein said pipeline is secured on trestle support arms positioned along a corridor on said skid rack.

7. In the method according to claim 1, wherein said steps further include stacking said ramp assembly on to the storage skid rack for transportation.

8. In the method according to claim 1, wherein said storage skid rack and said ramp assembly are transported on a single transport trailer.

9. A method of transporting and assembling a natural gas conduit, the steps comprising:
    transporting a skid rack and ramp assembly to a work site;
    separating said skid rack from said ramp assembly;
    aligning said ramp assembly in an end-to-end configuration with said skid rack;
    removing a first pipeline from trestle support arms positioned along a corridor on said skid rack;
    connecting a second pipeline located on said skid rack to said first pipeline wherein said first pipeline and said second pipeline connect said skid rack to said ramp assembly through bulkhead face plate openings;
    top loading said first pipeline into tunnels formed by said ramp assembly;
    placement of tunnel ramp covers on said ramp assembly; and
    connecting said first pipeline or said second pipeline to a natural gas, air, liquid, or cable from any supply source facility to a wide variety of engines, compressors, pumps, or power supplies.

10. The method according to claim 9 wherein said trestle support arms include at least three tiers of lateral, upwardly angular, pipe support arms.

11. The method according to claim 10 wherein said support arms are in a vertical spaced relationship so that the arms are capable of carrying a plurality of hoses.

12. The method according to claim 10 wherein power cables are secured to said support arms.

13. The method according to claim 9 wherein said corridor is in longitudinal alignment with said face plate openings.

14. The method according to claim 9 wherein said first pipeline and said second pipeline are connected through the entire length of the skid rack and the ramp assembly.

15. The method according to claim 9 wherein piping for compressed air and purge lines may also be run through said face plate openings.

16. The method according to claim 9 wherein said skid frame includes a pair of transverse cylindrical bumpers.

17. The method according to claim 9 wherein said skid frame is stackable for transport on said ramp assembly.

18. The method according to claim 9 wherein distribution piping, purge pipe, compressed air line or electrical cables may be non-releasably secured on said skid rack.

* * * * *